(12) United States Patent  (10) Patent No.: US 8,918,559 B2
Amann et al.  (45) Date of Patent: Dec. 23, 2014

(54) PARTITIONING OF A VARIABLE LENGTH SCATTER GATHER LIST

(75) Inventors: Stefan Amann, Boeblingen (DE);
Gerhard Banzhaf, Boeblingen (DE);
Ralph Friedrich, Sindelfingen (DE);
Raymond M. Higgs, Poughkeepsie, NY (US); George P. Kuch, Poughkeepsie, NY (US); Bruce H. Ratcliff, Red Hook, NY (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 13/153,516

(22) Filed: Jun. 6, 2011

(65) Prior Publication Data

US 2012/0311201 A1   Dec. 6, 2012

(51) Int. Cl.
  *G06F 3/00*  (2006.01)
  *G06F 5/00*  (2006.01)
  *G06F 13/00*  (2006.01)
  *G06F 13/36*  (2006.01)
  *G06F 9/26*  (2006.01)
  *H04J 3/22*  (2006.01)
  *H04J 3/04*  (2006.01)
  *G06F 13/20*  (2006.01)

(52) U.S. Cl.
  CPC ..................................... *G06F 13/20* (2013.01)
  USPC ........ 710/52; 710/5; 710/20; 710/21; 710/30; 710/36; 710/107; 710/310; 711/212; 370/470; 370/536

(58) Field of Classification Search
  CPC ... H04L 29/06027; H04L 69/22; H04L 69/18; H04L 69/24
  USPC ........................................................ 369/53.17
  See application file for complete search history.

(56) References Cited

U.S. PATENT DOCUMENTS

| | | | | |
|---|---|---|---|---|
| 3,704,453 | A | * | 11/1972 | Blackwell et al. ............... 710/21 |
| 5,497,476 | A | * | 3/1996 | Oldfield et al. ................ 711/112 |
| 5,539,755 | A | * | 7/1996 | Baggen ......................... 714/779 |
| 6,345,324 | B1 | | 2/2002 | Baskey et al. |
| 6,401,145 | B1 | * | 6/2002 | Baskey et al. ................... 710/52 |
| 6,606,715 | B1 | * | 8/2003 | Kikuchi ......................... 714/15 |

(Continued)

OTHER PUBLICATIONS

Adlung, et al., FCP for the IBM eServer zSeries Systems: Access to Distributed Storage, IBM J. Res. & Dev. vol. 46, No. 4/5 Jul./Sep. 2002, pp. 487-502.

(Continued)

*Primary Examiner* — Farley Abad
*Assistant Examiner* — Henry Yu
(74) *Attorney, Agent, or Firm* — Cantor Colburn LLP; Steven Chiu (57) ABSTRACT

Partitioning of a variable length scatter gather list including a processor for performing a method that includes requesting data from an I/O device comprising an I/O buffer. The requesting includes initiating a subchannel. The method further includes determining whether the subchannel supports data divisions by requesting SSQD data from the I/O device and inspecting at least one bit in the SSQD data. A determination is made whether the requested data includes a metadata block in response to determining that the subchannel support data divisions. Also, the subchannel is notified that the requested data includes the metadata block in response to determining that the requested data includes the metadata block. A location of storage is identified in an SBAL in response to notifying the subchannel.

9 Claims, 7 Drawing Sheets

(56) References Cited

U.S. PATENT DOCUMENTS

| | | | |
|---|---|---|---|
| 6,922,445 B1* | 7/2005 | Sampath et al. | 375/267 |
| 8,111,672 B2* | 2/2012 | Friedrich | 370/338 |
| 8,670,457 B2* | 3/2014 | Anderson et al. | 370/454 |
| 2003/0208635 A1* | 11/2003 | Stevens | 709/314 |
| 2005/0289246 A1 | 12/2005 | Easton et al. | |
| 2006/0200595 A1* | 9/2006 | Maharana et al. | 710/30 |
| 2006/0221824 A1* | 10/2006 | Anzai | 370/229 |
| 2008/0068958 A1* | 3/2008 | Park | 369/53.17 |
| 2008/0229147 A1* | 9/2008 | Earhart et al. | 714/15 |
| 2011/0106990 A1* | 5/2011 | Higgs et al. | 710/73 |

OTHER PUBLICATIONS

Srikrishnan, et al., Sharing FCP Adapters Through Virtualization, IBM J. Res & Dev., vol. 51, No. 1/2, Jan./Mar. 2007, pp. 103-118.

Baskey, et al., zSeries Features for Optimized Sockets-Based Messaging: HiperSockets and OSA-Express, IBM J. Res & Dev. vol. 46, No. 4/5, Jul./Sep. 2002, pp. 475-485.

* cited by examiner

PARTITIONING OF A VARIABLE LENGTH SCATTER GATHER LIST

BACKGROUND

The present invention relates generally to computer system input/output (I/O) processing, and more specifically to efficient handling of queued-direct I/O (QDIO) requests associated with data protection information for communicating with small computer system interface devices.

A QDIO request provides a means for a program, such as an operating system, to directly and asynchronously communicate with one or more I/O devices (or a network of devices), or to other programs or operating systems via an external or internal network, by the use of data queues constructed and managed in main storage of a computer system. The use of main storage queues allows the communication to be performed in a predictable and efficient manner without requiring the services of a centralized controlling mechanism, such as an operating system I/O supervisor, and the resulting overhead such a mechanism implies.

An adapter supporting QDIO may have input queues and/or output queues. When QDIO input queues are used, the program can directly access data placed into the input queues by the adapter. Typically, the source of the data placed into such input queues is an I/O device or network of devices to which the adapter is connected. Correspondingly, when QDIO output queues are used, the program can transmit data directly to the adapter by placing data into the appropriate output queues. Depending on the adapter, the data placed into such output queues may be used internally by the adapter or may be transmitted to one or more I/O devices to which the adapter is connected Each QDIO queue may be associated with 128 buffers. The queue component that describes a buffer is referred to a storage-buffer-address list (SBAL). An SBAL is effectively a scatter/gather list that designates up to 16 storage areas that comprise the I/O buffer that the adapter uses to transfer data. Therefore, the SBAL is comprised of 16 SBAL entries (SBALEs), each of which may designate a storage block of the buffer.

For both QDIO input queues and QDIO output queues, main storage is used as the medium by which data is exchanged between the program and the adapter. Additionally, these queues provide the ability for both the program and the adapter to directly communicate with each other in an asynchronous manner that is both predictable and efficient without requiring the services of a centralized controlling mechanism, such as an operating-system input/output supervisor, and the resulting overhead such a control mechanism implies. Both input and output queues are constructed in main storage by the program and are initialized and activated when connection to the adapter is established at the QDIO. Each queue is made up of multiple separate data structures, called queue components that collectively describe characteristics of the queue and provide the necessary controls to allow the exchange of data between the program and the adapter.

Associated with a QDIO queue's 128 buffers is a 128-byte array. Each byte in the array contains the state of the corresponding buffer and acts as a finite state machine for the buffer. This array is referred to as a storage-list-state block (SLSB). When an SLSB indicates that the corresponding buffer is in the adapter-owned state, the adapter may use the buffer to transfer data to the program, and the program does not reference or change the buffer. Otherwise, when an SLSB indicates that the corresponding buffer is in the program-owned state, the program may reference and/or change the buffer and the adapter does not use the buffer for data transfer.

SUMMARY

An embodiment is a method that includes requesting data from an I/O device comprising an I/O buffer, the requesting via a processor. The requesting includes initiating a subchannel. A determination is made whether the subchannel supports data divisions, the determining includes requesting SSQD data from the I/O device and inspecting at least one bit in the SSQD data. A determination is made whether the requested data includes a metadata block, the determination is in response to determining that the subchannel support data divisions. The subchannel is notified that the requested data includes the metadata block in response to determining that the requested data includes the metadata block. A location of storage is identified in response to the notifying.

Another embodiment is a system having a processor configured to perform a method that includes requesting data from an I/O device comprising an I/O buffer. The requesting includes initiating a subchannel. The processor determines whether the subchannel supports data divisions by requesting SSQD data from the I/O device and inspecting at least one bit in the SSQD data. A determination is made whether the requested data includes a metadata block, the determination is in response to determining that the subchannel support data divisions. The subchannel is notified that the requested data includes the metadata block in response to determining that the requested data includes the metadata block. A location of storage is identified in response to the notifying.

A further embodiment is a computer program product including a tangible storage medium readable by a processing circuit and storing instructions for execution by the processing circuit for performing a method including requesting data from an I/O device comprising an I/O buffer, the requesting comprising initiating a subchannel. The method includes determining whether the subchannel supports data divisions, the determining comprising requesting SSQD data from the I/O device and inspecting at least one bit in the SSQD data. Also, the method includes determining whether the requested data includes a metadata block in response to determining that the subchannel support data divisions. The subchannel is notified that the requested data includes the metadata block in response to determining that the requested data includes the metadata block. Also, A location of storage is identified in response to the notifying.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments of the invention provide for efficient handling of queued-direct input/output (QDIO) requests to communicate with devices using small computer system interface (SCSI) and fiber channel protocol (FCP) that incorporate protection information associated with SCSI. Each queue includes multiple separate data structures, referred to herein as "queue components", that collectively describe the queue characteristics and provide controls to allow the exchange of data between a program and a control I/O adapter. The queue component that describes a storage buffer is referred to herein as a "storage-buffer-address list (SBAL)" or as a "scatter-gather list". The SBAL for FCP communications includes a handle, a command buffer, a variable length list of data buffers, and a variable length list of protection information buffers. The use of count fields throughout the scatter-gather list allows indexing into the scatter-gather list. The adapter can place or extract content from QDIO queues in conjunction with I/O instructions in a program executed by a processor. The QDIO queues provide the ability for both the program and the control I/O adapter to directly communicate with each other in an asynchronous manner that is both predictable and efficient without requiring services of a centralized controlling mechanism, such as an operating-system input/output supervisor.

Figure 1:
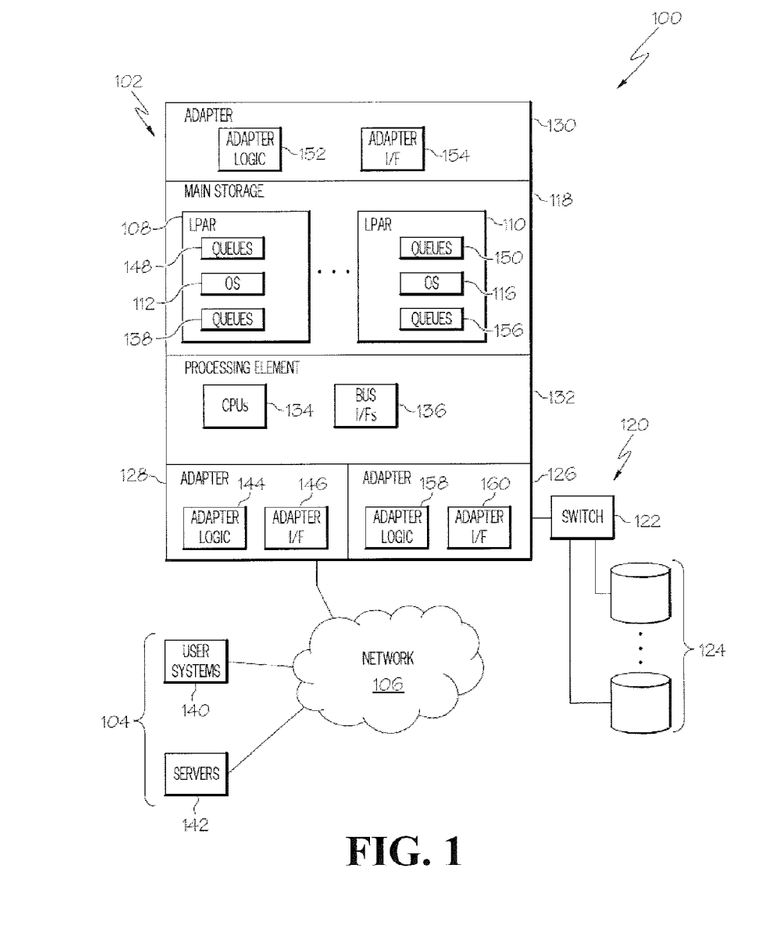
FIG. 1 depicts an example of a system in accordance with exemplary embodiments.

Turning now to the drawings, there is shown in FIG. 1 a block diagram of a system 100 upon which efficient handling of QDIO requests and completions is implemented in exemplary embodiments. The system 100 of FIG. 1 includes a host system 102 in communication with remote systems 104 over a network 106. In exemplary embodiments, the host system 102 is a high-speed processing device (e.g., a mainframe computer) including at least one processing circuit (e.g., a CPU) capable of reading and executing instructions, and handling numerous I/O requests from the remote systems 104.

The host system 102 shown in FIG. 1 includes multiple logical partitions (LPARs) 108 and 110 to support multiple operating systems (OSs) 112 and 116, where the OSs 112 and 116 are examples of programs that are executed by the host system 102. The LPARs 108 and 110 can function as separate virtual servers on the host system 102. The LPARs 108 and 110 may be implemented in main storage 118, where main storage 118 is computer memory for the host system 102. The host system 102 can also interface with one or more I/O devices, such as, but not limited to storage devices 124, tape drives, and printers. Shown in FIG. 1 is a storage network 120. The storage network 120 can include one or more switches 122 to access one or more storage devices 124. The storage devices 124 may also include one or more small computer system interface (SCSI) devices. The one or more switches 122 may also perform protocol conversion, for instance FCP to SCSI, where the host system 102 supports FCP via adapter 126.

The host system 102 may support a number of adapters for different communication paths between the OSs 112 and 116 and other elements of the system 100. For example, adapter 128 can be used to establish a communication path between the host system 102 and the network 106. Additionally, adapter 130 supports communication between LPARs 108 and 110, and thus adapter 130 may be a totally virtual device simulated by firmware in memory.

A processing element 132 can be used to execute instructions on processing circuits, such as central processing units (CPU) and interface with main storage 118 and adapters 126-130 via bus interface 136. The bus interface 136 can support a variety of communication protocols known in the art. For example, the bus interface 136 may support a self-timed interface (STI) bus and a peripheral controller interface (PCI) bus, in addition to other bus protocols.

The remote systems 104 may issue I/O requests for retrieval of data from storage devices 124 of storage network 120. I/O requests from remote systems 104 can be received via network 106 at adapter 128 and passed to queues 138 for further processing by OS 112. The remote systems 104 may include user systems 140, such as desktop, laptop, or general-purpose computer devices, and servers 142. The network 106 may be any type of communications network known in the art, including wireless, wired, and/or fiber optic links. Additional computer systems (not depicted) can also be accessed via the network 106 or other networks. Adapter logic 144 and an adapter interface 146 can transfer I/O requests and data to the queues 138 in main storage 118. The OS 112 can interrogate the queues 138 and determine a course of action. The OS 112 may determine that an I/O request should be generated to access the storage network 120. In this example, an I/O request is written to queues 148 of LPAR 108 and transferred to queues 150 of LPAR 110 by adapter logic 152 and adapter interface 154 of adapter 130. OS 116 transfers the I/O request to queues 156 of LPAR 110, where adapter logic 158 and adapter interface 160 transfer the I/O request to storage network 120. Completion status associated with the I/O request may follow a reverse communication flow.

In exemplary embodiments, the queues 138, 148, 150, and 156 are QDIO queues. The OSs 112 and 116 construct the queues 138, 148, 150, and 156 in main storage 118. The queues 138, 148, 150, and 156 can include input and output queues. The adapters 126-130 place data received from network 106, storage network 120, and cross-LPAR data into the queues 138, 148, 150, and 156, enabling the OSs 112 and 116 to access the data. Correspondingly, the OSs 112 and 116 can place data in the queues 138, 148, 150, and 156 for the adapters 126-130 to transmit. The adapters 126-130 and/or the OSs 112 and 116 may also internally use data placed into the queues 138, 148, 150, and 156 to provide configuration and status information. The adapters 126-130 support direct memory access (DMA) to minimize interrupts and other overhead associated with passing data and status information between the adapters 126-130 and memory allocated by the OSs 112 and 116 that is described by the queues 138, 148, 150 and 156. Each of the queues 138, 148, 150, and 156 may represent a queue set that provides for separate outbound and inbound queues. For example, each queue set can include four outbound and at least one inbound queue. Applications are assigned to at least one queue set which includes a number of input and output queues, and each queue set can share one or more of the adapters 126-130. The queue sets provide for a list of useable buffers and also a list of storage blocks for incoming/outgoing data. The buffers may be further prioritized to address specific application needs.

In an embodiment, the OSs 112 and 116 and the adapters 126-130 use a state change signaling protocol in order to facilitate the exchange of data. This protocol is applied to each input and output data buffer associated with each active input and output queue. Both input and output buffers are managed and exchanged between the OSs 112 and 116 and the adapters 126-130 by placing buffers into various states which are maintained in a designated location that is set aside and is associated with each buffer. These states include ownership information that identifies either the program or the adapter as the controlling element of the buffer. For example, for input queues, asynchronous to the execution of the OSs 112 and 116, the adapters 126-130 place data received from an associated I/O device into input buffers that are in an input buffer empty state. For each input buffer that has data placed into it by the adapters 126-130, the state of the buffer is changed from input buffer empty, which is a I/O-adapter-owned state, to input buffer primed, which is program-owned state. At the time the adapters 126-130 change the buffer states, the adapters 126-130 may also request an I/O interruption, specifically an I/O-adapter interruption. The OSs 112 and 116 examine in sequence (such as round robin) the state of all input buffers associated with all QDIO input queues and process the data in each input buffer that is in the input buffer primed state. Upon completion of input buffer processing, the OSs 112 and 116 may change the state of the buffers to input buffer empty in order to make the buffers available for reuse by the adapters 126-130 for subsequent transactions. When the OSs 112-116 change the state of one or more input queue buffers from primed to empty, a signal adapter instruction may be executed in order to signal the adapters 126-130 that one or more input buffers are available for use.

Similarly, for output queues, asynchronous to the execution of the adapters 126-130, the OSs 112 and 116 may place output data into one or more QDIO output queue buffers that are in the output buffer empty state, output buffer not initialized state, or output buffer error state, which are program-owned states, and then change the state of each such buffer to the output buffer primed state, which is an adapter-owned state. At the time the adapters 126-130 change the buffer states, the adapters 126-130 may also request an I/O interruption, specifically an I/O-adapter interruption. The OSs 112 and 116 can execute a Signal Adapter instruction in order to signal the adapters 126-130 that one or more output queues have data to be transmitted. Asynchronous to the execution of the OSs 112 and 116, the adapters 126-130 transmit the data in each QDIO output buffer that is in the output buffer primed state. Upon completion of transmission, the adapters 126-130 change the state of each such buffer to the output buffer empty state in order to make the buffer available for reuse by the OSs 112 and 116.

Figure 2:
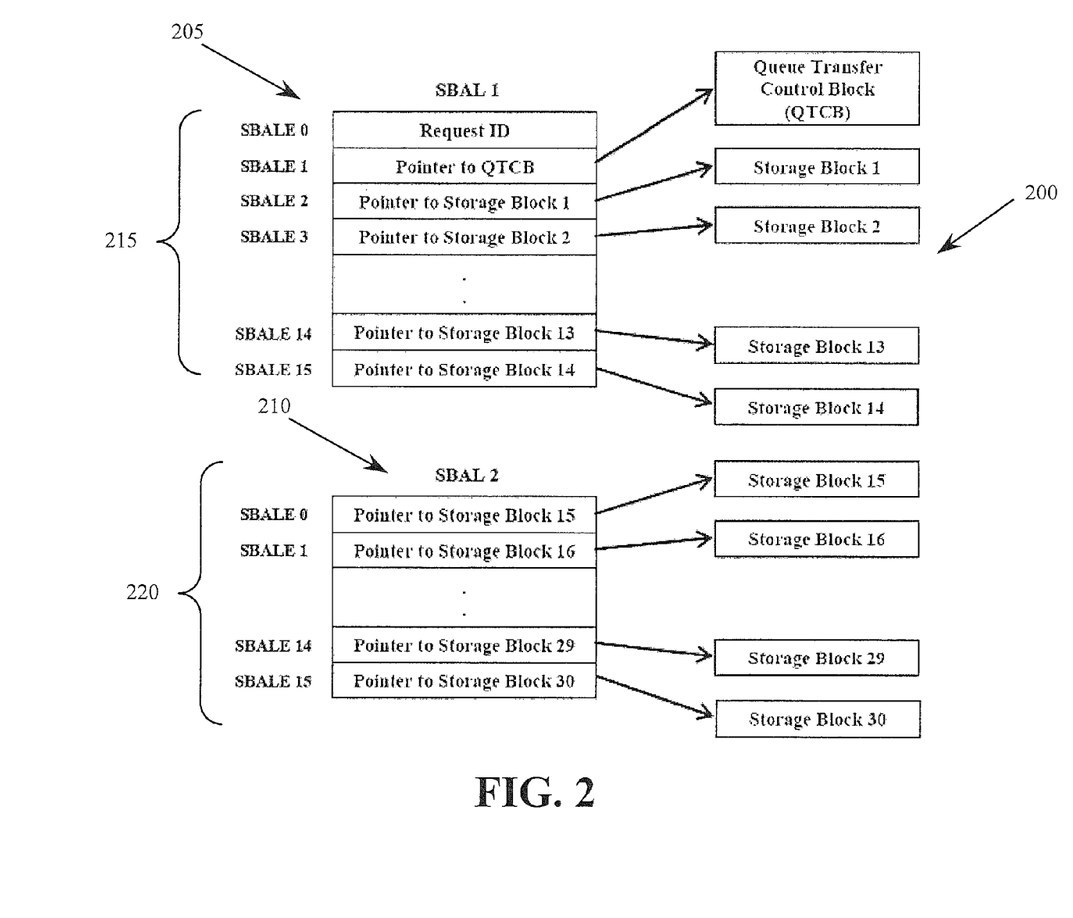
FIG. 2 depicts an example of a queuing mechanism for an input/output (I/O) request.

FIG. 2 depicts a queue 200 associated with an I/O request. Particularly, the queue 200 includes an SBAL 205 that may be chained together with SBAL 210 into a single I/O request to transfer data. In an exemplary embodiment, each SBAL 205, 210 describes a buffer and includes SBAL entries (SBALEs) that designates up to 16 storage areas, each of which may designate a storage block of the buffer. The storage blocks 215, 220 are of variable length and ordering of these storage blocks 215, 220 may be utilized to access the user data.

Figure 3:
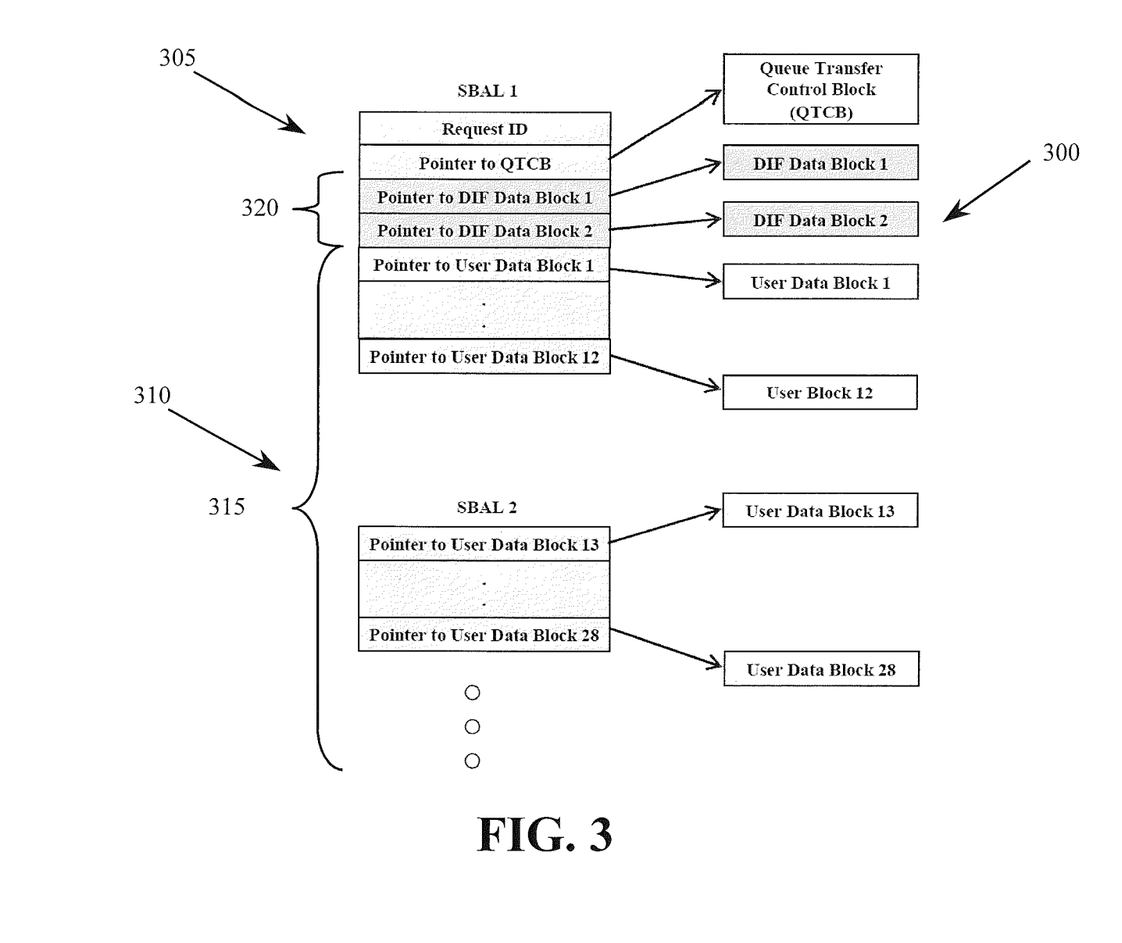
FIG. 3 depicts another example of a queuing mechanism with another I/O request in accordance with an embodiment.

FIG. 3 depicts a queuing mechanism 300 including multiple SBAL's in accordance with exemplary embodiments. Particularly, each SBAL, such as SBAL 305, describes a buffer, which is effectively a scatter/gather list that may be chained together with SBAL 310 into a single I/O request to transfer data. As shown, the single I/O request includes variable length data integrity fields 320 (also call protection information block) and two SBAL's 305, 310 in the I/O request. Therefore, the counts may span SBAL boundaries. The two SBAL's provide a variable length list of addresses of user data buffer blocks 315 (also called storage block) across SBAL's. In addition to the variable length data integrity field 320, the user data block 315 is a variable length memory portion of the SBAL, and now ordering by itself is no longer enough to easily parse the list.

Figure 4:
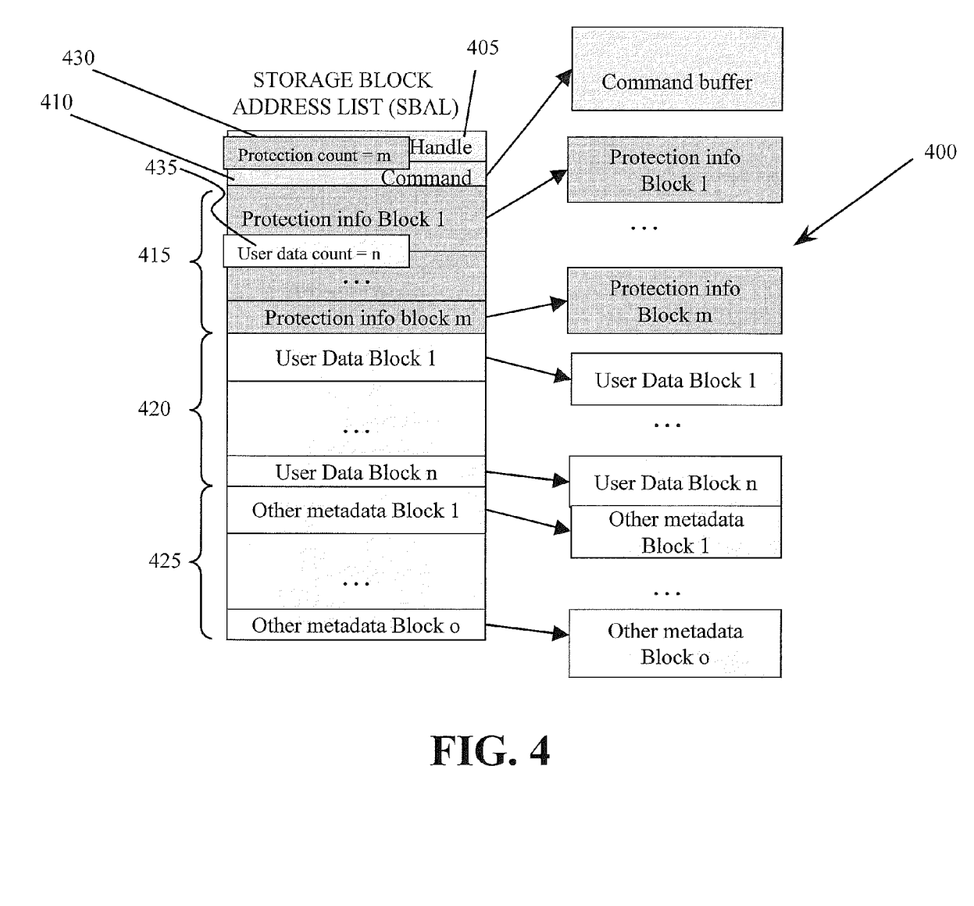
FIG. 4 depicts another example of a queuing mechanism with an I/O request in accordance with an embodiment.

As shown in the embodiment in FIG. 4, SBAL 400 contains addressing for SCSI end-to-end data protection buffers including available count fields provided throughout the SBAL 400 for a high-level negotiation between the OS and adapter in accordance with an embodiment of the invention. In one exemplary embodiment, the SBAL 400 includes a handle block 405, a command buffer block 410, and a plurality of metadata blocks including a first variable length of data protection buffer block 415, a second variable length of user data buffer block 420, a third variable length for other metadata buffer block 425, as well as a protection count field 430, and a user data count field 435. In other exemplary embodiments, additional metadata blocks are provided. The protection count field 430 is provided at a known byte location in SBAL 400 before the protection block 415 and is utilized to describe the length of the protection block 415. Similarly, the user data count field 435 is provided at a known byte location in SBAL 400 before the user data block 420 and is utilized to describe the length of the user data block 420. For ease of understanding, each variable length list 415, 420, 425 is referred to as a data division. For Q data divisions in the SBAL 400, Q-1 count fields are required. An exemplary embodiment in FIG. 4 includes 3 data divisions (415, 420, and 425) and 2 count fields. The last data division (or variable length list) may start immediately after the last fully described data division and extends to the end of the scatter-gather list 400. The use of count fields 430, 435 allows firmware to quickly index into the scatter-gather list 400. As a result, no iterating is required. Each count field 430, 435 requires a negotiation between the OS and the channel that is being utilized, where a channel provides an independent data and control path between I/O devices and memory. Also, the negotiation between the OS and the channel may not result in a QDIO request using a count field if no protection block is provided. Even when the use of a count field is negotiated, not all I/O requests may use the count field if no protection block is utilized. As the OS may be working with older or newer channels, negotiation is the mechanism that the OS utilizes to use data divisions.

Figure 5:
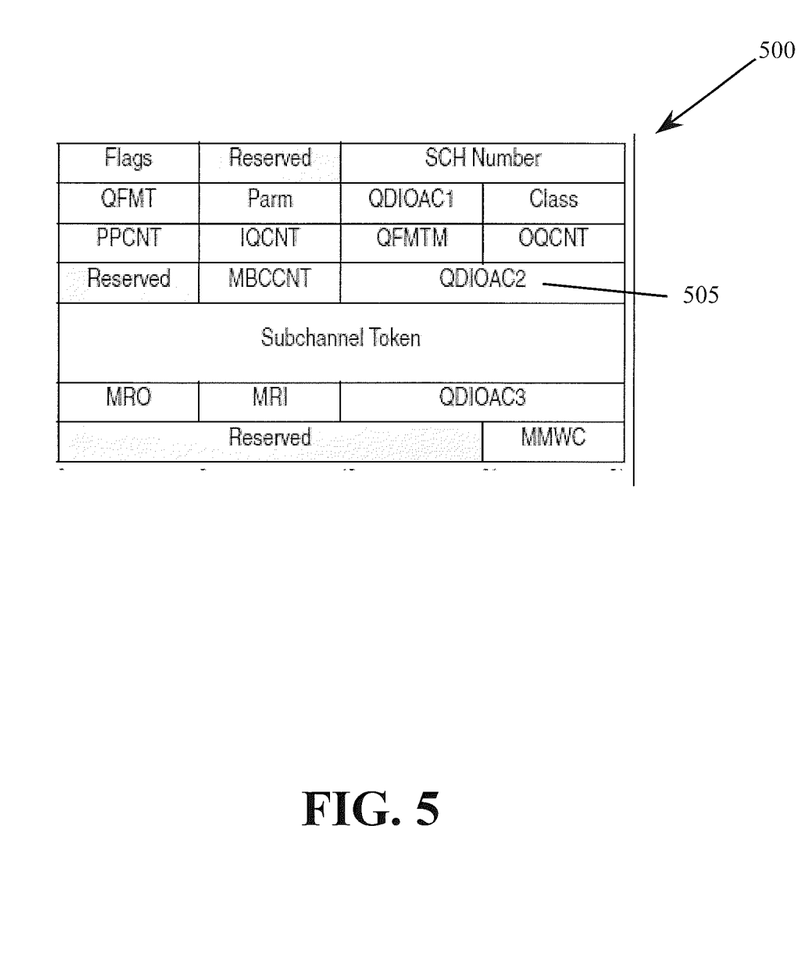
FIG. 5 depicts an example structure of a store subchannel queued direct I/O (QDIO) data in accordance with an embodiment.

FIG. 5 depicts an embodiment of store subchannel QDIO data (SSQD) 500 received by the OS in response to a channel subsystem call (CHSC) during a QDIO establish process. The SSQD 500 represents the mechanism used by the OS to negotiate the use of new count fields described above in FIG. 4. When the OS sets up a QDIO subchannel, it may query the capabilities of the channel for supporting data divisions by executing the channel subsystem call (CHSC) to generate the store subchannel QDIO data (SSQD). In an exemplary embodiment, the SSQD includes two bits in QDIOAC2 505 for implementing data divisions. These two bits specify whether data divisions are available and enabled. As shown in the FIG. 5, if the channel supports data divisions, then the available bit in QDIOAC2 505 is set. Also, if the OS and channel have successfully negotiated data divisions, then the enabled bit is set.

Figure 6:
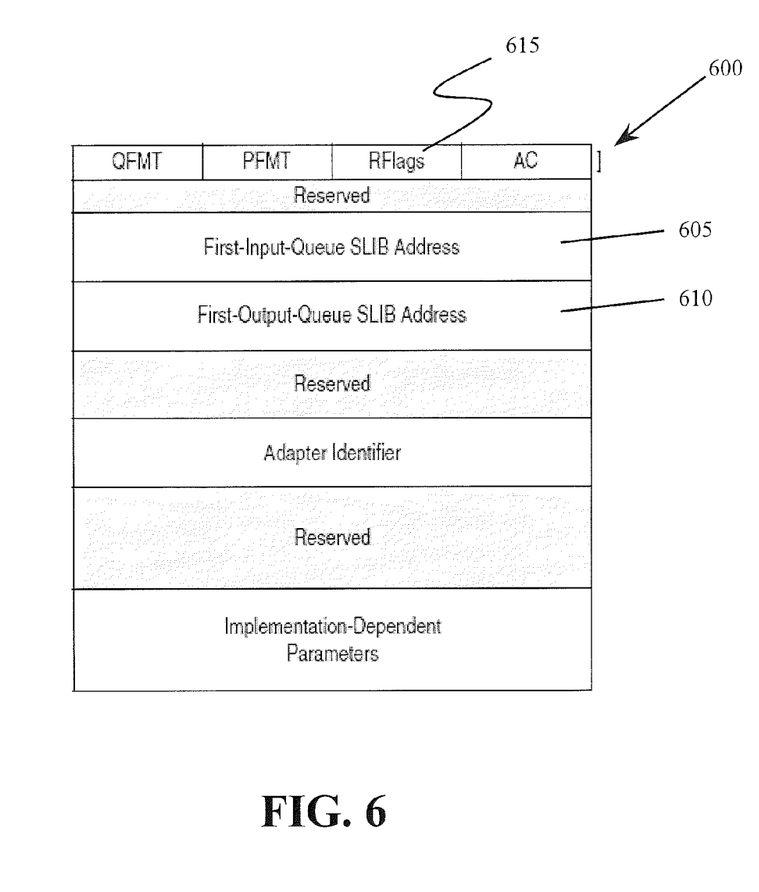
FIG. 6 depicts another example structure of a queue information block in accordance with an embodiment.

FIG. 6 depicts an exemplary queuing mechanism for a queue information block 600 (QIB) during the QDIO establish process. A QIB 600 contains information about QDIO input queues and output queues including an input queue SLIB address 605, and output queue SLIB address 610, and Request Flags 615 (RFlags). The operating system requests data divisions during the QDIO establish process by setting the bit in the RFlags 615. After QDIO establish, the OS may issue another SSQD (FIG. 5) and inspect the data divisions enabled bit. If the enabled bit is set, then the channel agrees that the data divisions feature is activated. If the enable bit is not set, the channel does not support data divisions and the OS may not use the data divisions count fields (FIG. 4).

Figure 7:
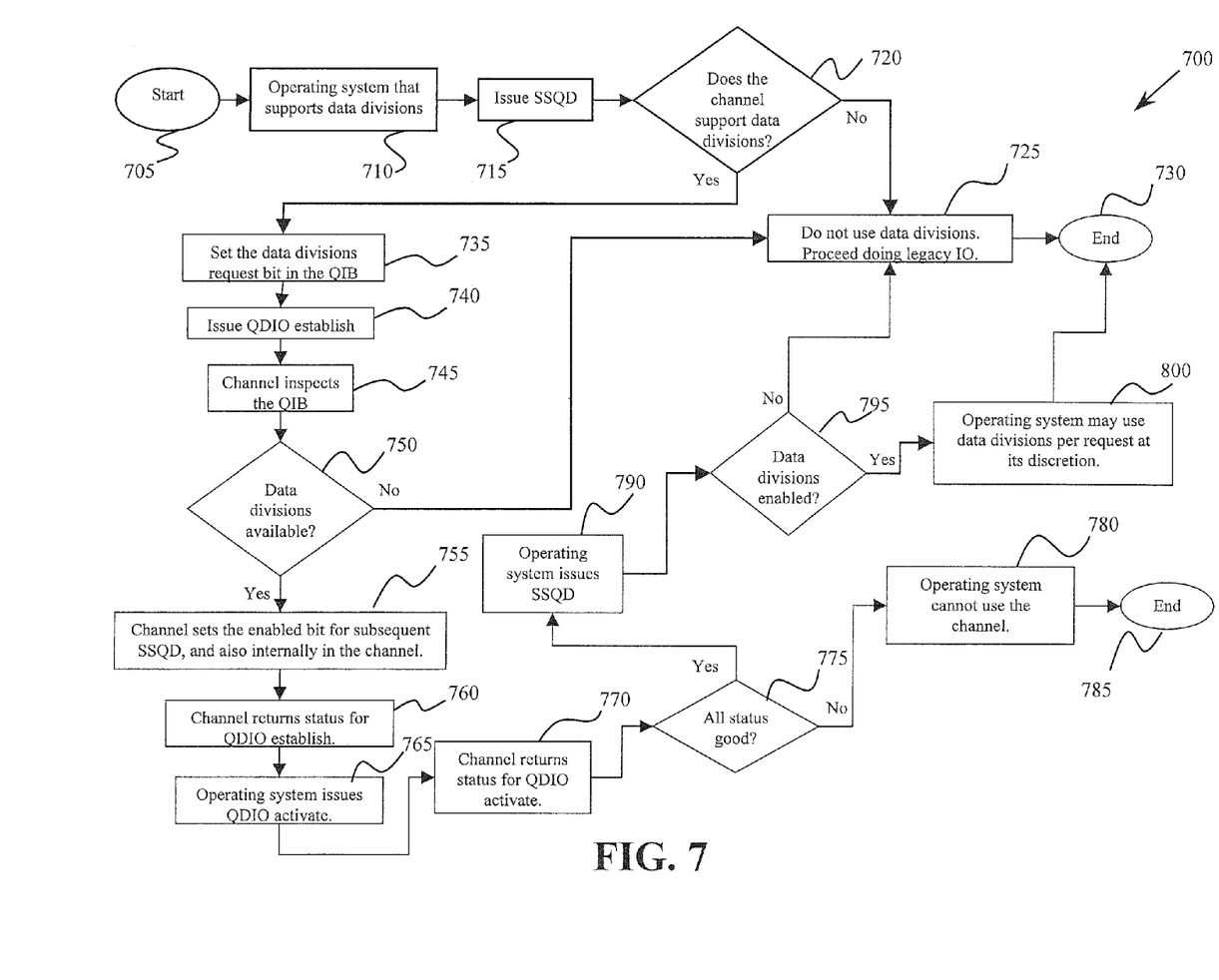
FIG. 7 depicts an exemplary process flow for negotiation of data division bits shown in FIG. 4-6 in accordance with an embodiment.

With particular reference to FIG. 7, a high-level operating system negotiation method 700 is illustrated in accordance with exemplary embodiments. In one example, the method may begin at 705. A determination is made as to whether the operating system may work with the input/output channel at 710, where the operating system determines a QDIO subchannel and query capability of the channel for supporting data divisions by executing the Channel Subsystem Call (CHSC) to request the store subchannel QDIO data (SSQD) at 715. The SSQD is specific to a QDIO protocol and is used to determine if data division support is available at 720. This may be performed by determining whether the SSQD includes two bits in QDIOAC2 505 (shown in FIG. 5) for implementing data divisions. If one of the available bits in QDIOAC2 505 is not set, then the channel does not support data divisions, and the firmware may proceed with legacy I/O, such as that shown in FIG. 3, by summing byte counts and associating one byte of protection info for every 64 bytes of data at 725. Thereafter, the legacy method may end at 730.

However, if the available bit in QDIOAC2 505 (shown in FIG. 5) is set, then data division support is available and the operating system sets the request bit in RFlags 615 in QIB 600 (shown in FIG. 6) at 735. Next, the OS issues a QDIO establish command at 740 where the operating system tells the channel about certain aspects of memory that will be used for the QDIO protocol and the system-related control blocks to be used. At 745, the channel inspects the RFlags 615 (shown in FIG. 6) at 745 and determines whether data divisions is available at 750 by identifying the bit in the RFlags 615. If the bit is not available, then the firmware proceeds to legacy I/O 300 (FIG. 3) at 725. Thereafter, the legacy method ends at 730. If the channel finds the bit in the RFlags 615, then data divisions is available and the channel sets the enabled bit for subsequent requests of the SSQD at 755. The channel returns its status in another QDIO establish command at 760. At 765, the OS issues a QDIO activate command to utilize the QDIO queue for extracting and placing content or data. The channel returns the status of the QDIO activate instruction at 770.

A determination is made as to the status of the channel for the QDIO at 775. If the status query is not good, then the operating system cannot use the channel at 780 and the negotiation ends at 785. However, if the status of the channel is good, then the OS issues another SSQD at 790 and determines if the data divisions bit is enabled at 795. If the data division bit is enabled, then the OS may use data divisions at its discretion at 800. The method ends at 730. However, if the data divisions bit is not enabled, then the firmware proceeds to legacy I/O 300 (FIG. 3) at 725. Thereafter, the legacy method ends at 730.

Technical effects and benefits include the ability to track locations of protection data and user data as data is transmitted and received by an I/O subsystem.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
    requesting, via a processor, data from an input/output (I/O) device comprising an I/O buffer, the requesting comprising initiating a subchannel;
    determining whether the subchannel supports data divisions, the determining comprising requesting stored subchannel queued-direct I/O data (SSQD) from the I/O device and inspecting at least one bit in the SSQD data;
    determining whether the requested data includes a metadata block, the determining whether the requested data includes a metadata block responsive to determining that the subchannel support data divisions;
    notifying the subchannel that the requested data includes the metadata block in response to determining that the requested data includes the metadata block; and identifying a location of storage in a storage-buffer-address-list (SBAL) associated with the requested data, the identifying in response to the notifying;
    wherein the SBAL includes a protection count field configured to describe a length of a variable length protection information block and user data count field configured to describe a length of a variable length user data block, wherein the protection count field is located at a first known location before the variable length protection information block and the user data count field is located at a second known location in the variable length protection information block, wherein the variable length protection information block and the variable length user data block are separate from each other and do not encapsulate each other.

2. The method of claim 1, wherein the I/O buffer is stored in main storage associated with the processor and contents of the I/O buffer are modified by a program executed by the processor.

3. The method of claim 1, further comprising receiving the SSQD data in response to a channel subsystem call (CHSC) via the processor.

4. A system comprising a processor configured to perform a method, the method comprising:
    requesting, via a processor, data from an input/output (I/O) device comprising an I/O buffer, the requesting comprising initiating a subchannel;
    determining whether the subchannel supports data divisions, the determining comprising requesting subchannel queued-direct I/O data (SSQD) data from the I/O device and inspecting at least one bit in the SSQD data;
    determining whether the requested data includes a metadata block, the determining whether the requested data includes a metadata block responsive to determining that the subchannel support data divisions;

notifying the subchannel that the requested data includes the metadata block in response to determining that the requested data includes the metadata block; and identifying a location of storage in a storage-buffer-address-list (SBAL) associated with the requested data, the identifying in response to the notifying;

wherein the SBAL includes a protection count field configured to describe a length of a variable length protection information block and user data count field configured to describe a length of a variable length user data block, wherein the protection count field is located at a first known location before the variable length protection information block and the user data count field is located at a second known location in the variable length protection, wherein the variable length protection information block and the variable length user data block are separate from each other and do not encapsulate each other.

5. The system of claim 4, wherein the I/O buffer is stored in main storage associated with the processor and contents of the I/O buffer are modified by a program executed by the processor.

6. The system of claim 4, wherein the method further comprises receiving the SSQD data in response to a channel subsystem call (CHSC) via the processor.

7. A computer program product comprising:

a non-transitory computer readable tangible storage medium readable by a processing circuit and storing instructions for execution by the processing circuit for performing a method comprising:

requesting, via a processor, data from an I/O device comprising an I/O buffer, the requesting comprising initiating a subchannel;

determining whether the subchannel supports data divisions, the determining comprising requesting SSQD data from the I/O device and inspecting at least one bit in the SSQD data;

determining whether the requested data includes a metadata block, the determining whether the requested data includes a metadata block responsive to determining that the subchannel support data divisions;

notifying the subchannel that the requested data includes the metadata block in response to determining that the requested data includes the metadata block;

and identifying a location of storage in a storage-buffer-address-list (SBAL) associated with the requested data, the identifying in response to the notifying;

wherein the SBAL includes a protection count field configured to describe a length of a protection information block and user data count field configured to describe a length of a user data block, wherein the protection count field is located at a first known location before the variable length protection information block and the user data count field is located at a second known location in the variable length protection information block, wherein the variable length protection information block and the variable length user data block are separate from each other and do not encapsulate each other.

8. The computer program product of claim 7, wherein the method further comprises receiving the SSQD data in response to a channel subsystem call (CHSC) via the processor.

9. The computer program product of claim 8, wherein the I/O buffer is stored in main storage associated with the processor and contents of the I/O buffer are modified by a program executed by the processor.

* * * * *